United States Patent [19]

Foltz

[11] Patent Number: 4,948,451

[45] Date of Patent: Aug. 14, 1990

[54] AUTOMATIC CARPET STRIPPING APPARATUS AND METHOD

[76] Inventor: Mark S. Foltz, 1650 Lake Grove Rd., Petoskey, Mich. 49770

[21] Appl. No.: 389,801

[22] Filed: Aug. 4, 1989

[51] Int. Cl.[5] .................... B32B 31/18; A47L 11/12

[52] U.S. Cl. .................... 156/344; 15/93.1; 30/170; 83/167; 156/250; 156/523; 156/584; 299/37

[58] Field of Search .................... 15/93 R; 30/169, 170; 83/167; 156/250, 344, 523, 584; 299/37

[56] References Cited

U.S. PATENT DOCUMENTS

| | | | |
|---|---|---|---|
| 4,277,104 | 7/1981 | Sanchez | 299/37 |
| 4,394,052 | 7/1983 | Adams et al. | 299/37 X |
| 4,626,033 | 12/1986 | Anderson | 299/37 |
| 4,669,784 | 6/1987 | Grasse | 15/93 R X |
| 4,683,657 | 8/1987 | Anderson et al. | 30/170 |

*Primary Examiner*—Robert A. Dawson
*Attorney, Agent, or Firm*—Brooks & Kushman

[57] ABSTRACT

This invention relates to a self-propelled carpet stripping apparatus (10) which comprises a frame (12) and a pair of driven rollers (22) mounted on the frame (12) for rotation about horizontally disposed parallel axes. The rollers (22) are operable for receiving a loose end of a carpet therebetween to pull the carpet up off its supporting surface. As the carpet is pulled by the action of the rollers (22), the apparatus (10) is propelled forward and the carpet cut by knives (24) into an elongated strip.

10 Claims, 3 Drawing Sheets

AUTOMATIC CARPET STRIPPING APPARATUS AND METHOD

TECHNICAL FIELD

This invention relates to a carpet stripping apparatus and, more particularly, an improved self-propelled carpet stripping apparatus.

BACKGROUND ART

Most conventional carpet stripping machines utilize reciprocating blade members to perform the stripping. Examples of such machines are shown in the Anderson et al U.S. Pat. No. 4,683,657 and Anderson U.S. Pat. No. 4,626,033. An oscillating head for a floor stripping machine is shown in the Grass U.S. Pat. No. 4,669,784. Carpet strippers of this type tend to pull apart the carpet being stripped. A similar reciprocating blade member concept for stripping has been employed in the reciprocating shingle remover of Sanchez U.S. Pat. No. 4,277,104. All such reciprocating type machines are noisy and none are self-propelled.

In U.S. Pat. No. 4,394,052 to Adams et al, a carpet take-up device is disclosed in which a cable hooked to an edge of a carpet across the room is used to propel the device forward as a spool is rotated to wind up the cable. As the device is moved forward, a horizontally disposed blade separates the carpet from its supporting surface. This type of an arrangement is not self-contained and only works when the carpet being stripped has enough strength in its fibers to provide an anchor for pulling the device toward the anchor as the blade separates the carpet from the supporting surface.

DISCLOSURE OF INVENTION

An object of the present invention is to provide an improved carpet stripping apparatus of simple construction that is propelled by passing the lifted carpet between driven rollers, requires low maintenance, is quiet and safe.

In carrying out the above objects, the carpet stripping apparatus comprises a frame having forward and rearward ends and also having opposite sides. The frame includes a handle extending from the rearward end for guiding and maneuvering the carpet stripping apparatus. A pair of driven rollers is mounted on the frame for rotation about horizontally disposed parallel axes. The rollers are driven for counter-rotation with respect to each other and are operable for receiving a loose end of a carpet to be stripped from its supporting surface between the rollers. The rollers propel the apparatus forward as the carpet is fed through the rollers. A pair of knives mounted on the frame, one near each side, cuts the carpet into an elongated strip as the carpet stripping apparatus is propelled forward.

In a preferred embodiment of the invention, the carpet stripping apparatus includes front and rear support wheels for supporting the frame. A spring action top roller tension assembly mounted on the frame allows application and adjustment of a clamping action on the carpet between the rollers.

An electric motor coupled to the driven rollers drives the rollers. A switch mounted on the handle actuates the motor.

A method for stripping adhering carpet from a supporting surface using the aforementioned carpet stripping apparatus includes the steps of cutting the carpet on the supporting surface into one or more elongated strips. A short section of one of the strips is manually freed from the supporting surface. The short freed section of carpet is fed between the driven rollers so that the strip of carpet is pulled up and separated from the supporting surface as the rollers are driven.

The spring action top roller tension assembly can be adjusted to assure proper clamping of the carpet between the rollers and the rotation of the driven rollers causes the apparatus to be propelled forward and to thereby pull carpet off the supporting surface as the apparatus moves forward.

Preferably, the carpeting is pulled up at a right angle to the supporting surface as the carpet passes between the driven rollers.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
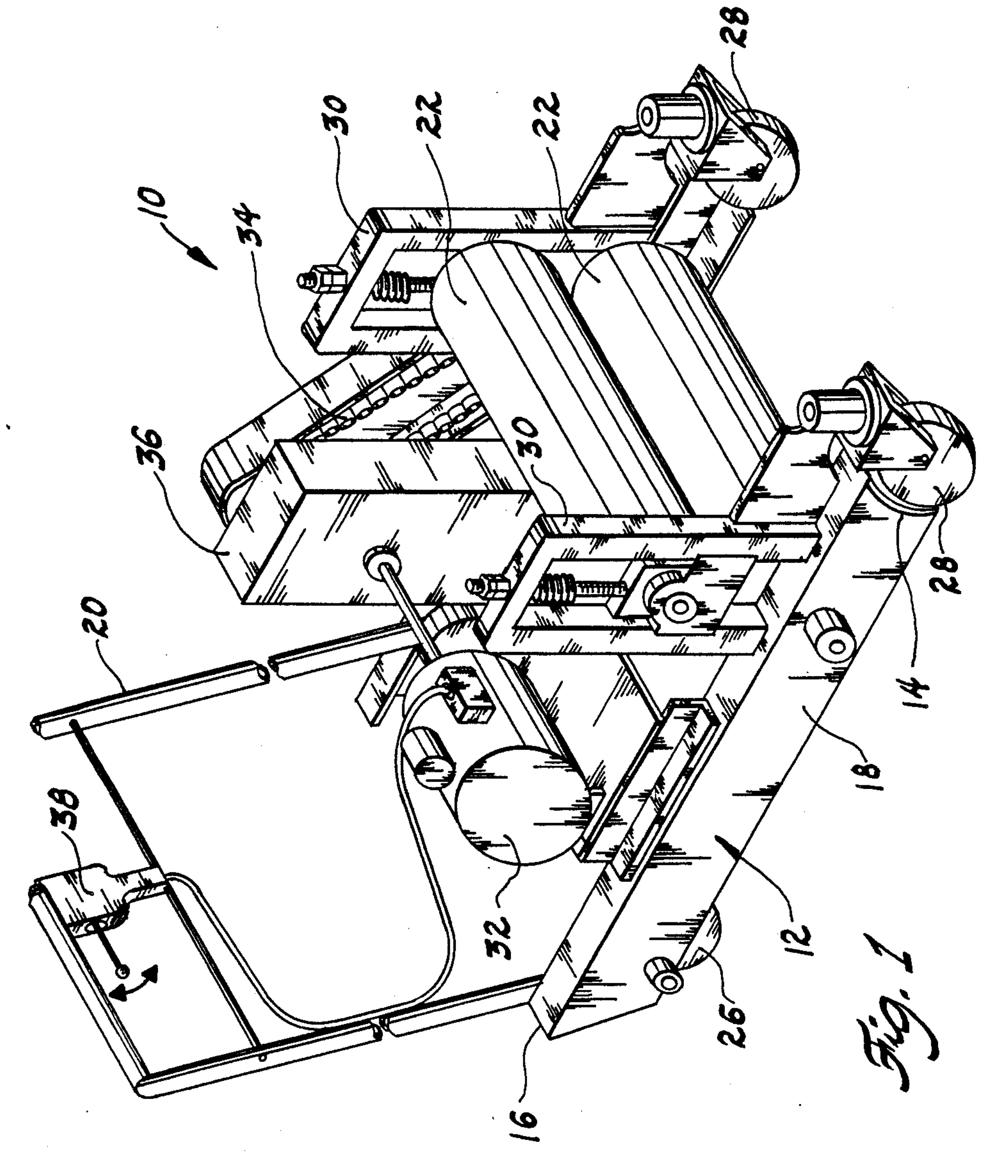
FIG. 1 is a perspective view of a carpet stripping apparatus constructed in accordance with the present invention.

With reference to FIG. 1 of the drawings, a carpet stripping apparatus constructed in accordance with the present invention is generally indicated by reference numeral 10 and is used to strip carpet from a supporting surface. As is more fully hereinafter described, the carpet stripping apparatus 10 is propelled by the stripping action.

As shown in FIG. 1 of the drawings, the carpet stripping apparatus 10 includes a frame 12, having forward end and rearward ends 14,16. Frame 12 also has opposite sides indicated by reference numeral 18 and 18'. The frame 12 includes a handle 20 that extends from the rearward end 16 of the frame 12 and is used for guiding and maneuvering the carpet stripping apparatus 10 during operation.

Figure 5:
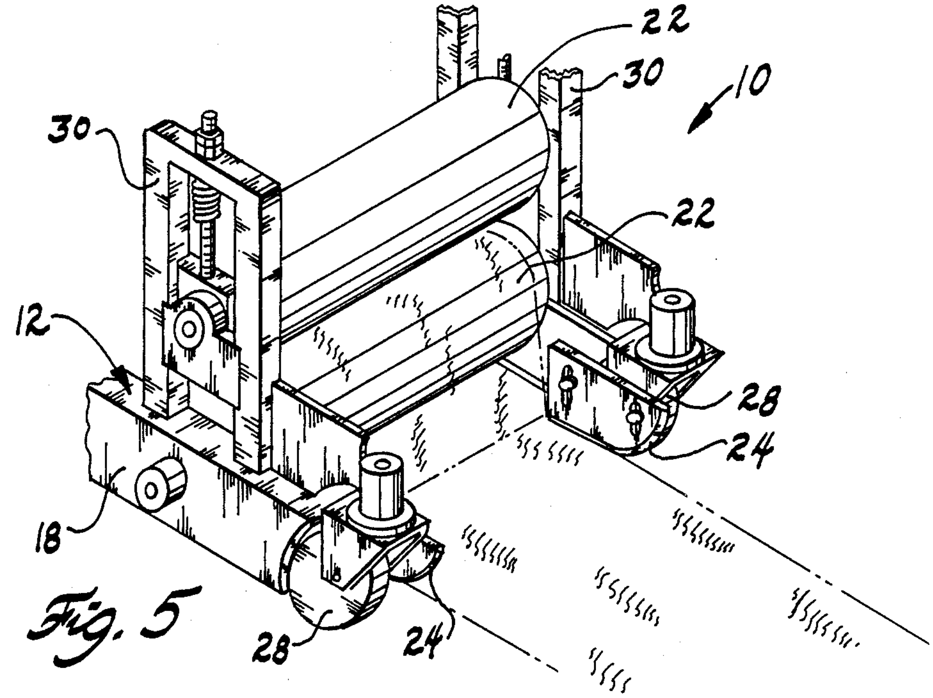
FIG. 5 is a sectional perspective view of the front of the apparatus illustrating the rollers, a spring action top roller tension assembly and a pair of knives mounted for cutting the carpet into an elongated strip.

With further reference to FIG. 1 and with reference to FIG. 5, a pair of driven rollers 22 is mounted, one at an upper and the other at a lower relative position, on frame 12 for rotation about horizontally disposed parallel axes. Rollers 22 are driven for counter-rotation with respect to each other and are operable for receiving a loose end of a carpet between the rollers, as shown in FIG. 5.

The rollers 22 propel the apparatus 10 forward as the carpet is fed through the rollers, the carpet having been pulled up from its supporting surface. A pair of knives 24, seen at FIG. 5, is mounted on the frame 12. Each knife 24 is mounted near one of the sides 18,18' and cuts the carpet into an elongated strip as the carpet stripping apparatus is propelled forward. These knives 24 are adjustable and are most effective when adjusted to cut the carpet in close proximity above the supporting surface.

Figure 3:
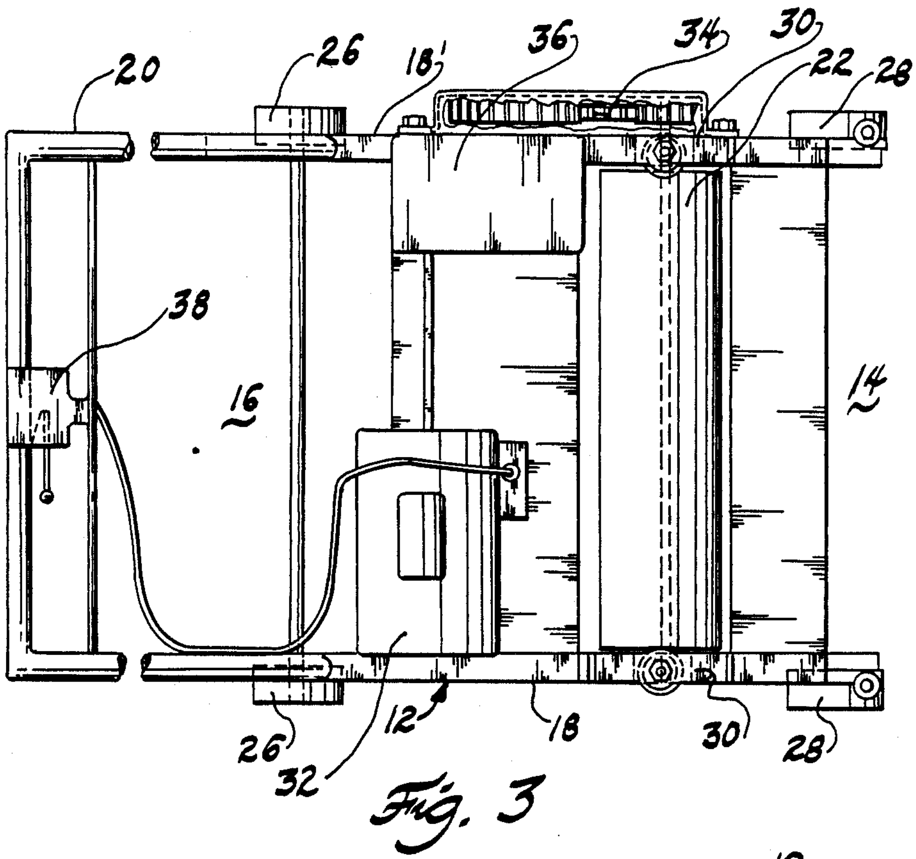
FIG. 3 is a plan view of the apparatus.
Figure 2:
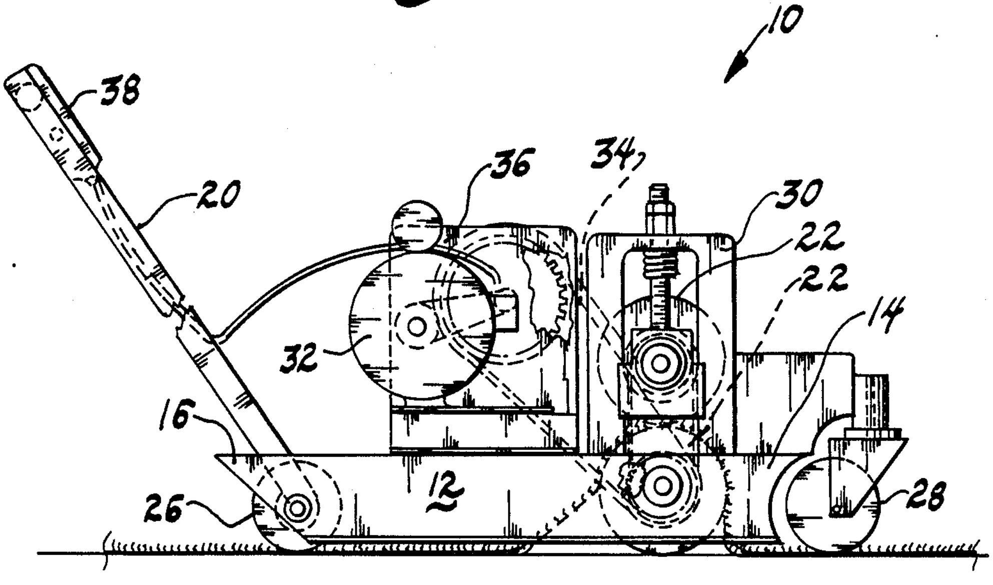
FIG. 2 is a side elevational view of the stripping apparatus illustrating the travel of cut carpet through the apparatus.

With reference to FIGS. 2 and 3 of the drawings, the carpet stripping apparatus 10 includes a rear support wheel 26 for supporting the frame and facilitating maneuverability of the apparatus. Also included are front support wheels 28 which also support the frame and maintain the elevation of the driven rollers 22 above the surface that supports the carpet being stripped. These front support wheels 28 are adjustable relative to the frame 12 to thereby adjust the elevation of the frame 12 and driven rollers 22 to accommodate carpet of different thicknesses.

With further reference to FIG. 2 of the drawings, the carpet stripping apparatus 10 further includes a spring action top roller tension assembly 30 mounted on the frame 12. The spring action top roller tension assembly 30 allows the application and adjustment of a clamping force on the carpet between the rollers 22 to thereby assure that the carpet is properly gripped between the rollers and as an adjustment for stripping carpet of various thicknesses.

With reference to FIG. 3 of the drawings, the carpet stripping apparatus 10 further includes an electric motor 32 coupled to the driven rollers 22 to drive the rollers and thereby pull the carpet up off its supporting surface and propel the apparatus forward. Coupling is accomplished via a chain 34 communicating rotational output of a gear reduction box 36, connected to motor 32, to the rollers 22 so that the rollers are positively driven.

Figure 4:
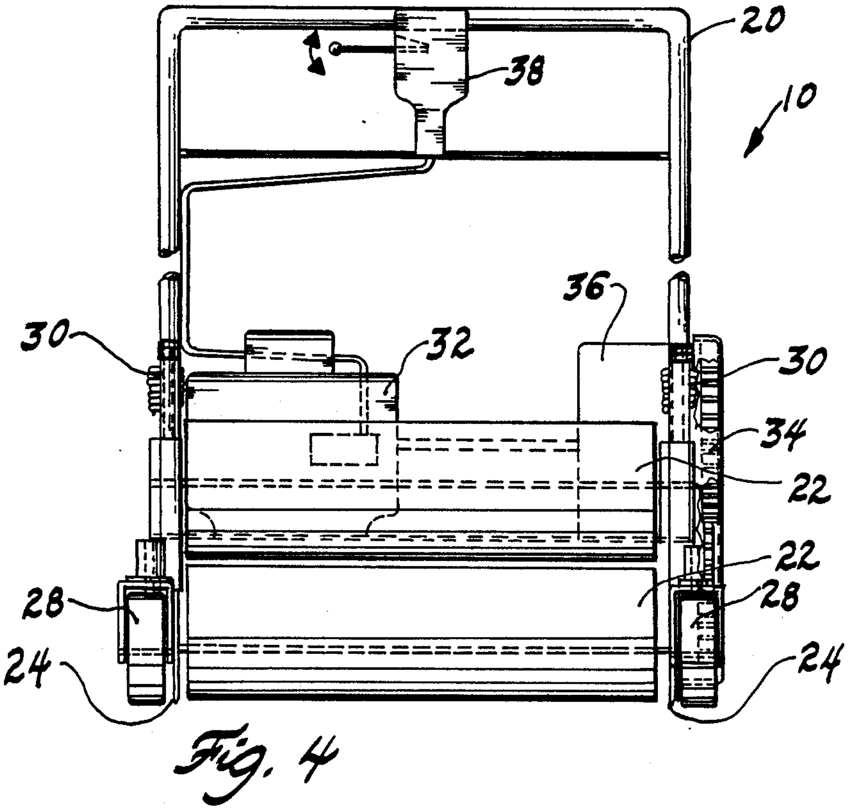
FIG. 4 is a frontal view of the apparatus illustrating a pair of driven rollers.

With reference to FIG. 4 of the drawings, handle 20 includes a switch 38 that actuates the motor. Switch 38 is a safety switch which requires manipulation by an operator to maintain operation of apparatus 10. If the operator lets go of the handle 20, operation of apparatus 10 is terminated.

Operation of the Invention

With reference to drawing FIGS. 1 through 5, carpet is stripped from a supporting surface using the hereinabove carpet stripping apparatus 10 by cutting the carpet on its supporting surface into one or more elongated strips. A short section of one of the elongated strips is freed from its supporting surface. Usually about six inches of carpet is sufficient. The short section of carpet is self-fed and clamped between the driven rollers 22. The counterrotational action of the driven rollers 22 pulls the carpet off its supporting surface at a right angle to the supporting surface and causes the carpet stripping apparatus 10 to be moved forward as the carpet is passed between the rollers.

Adjusting the spring action top roller tension assembly 30 assures proper clamping of the carpet between the rollers 22. As the carpet stripping apparatus 10 is propelled forward knives 24 cut the carpet to be stripped from its supporting surface to an elongated strip which is passed up and over the lower roller and between the rollers 22. The cut carpet continues feeding through the rollers 22 and back to the supporting surface behind the apparatus 10. After a pass is made with the carpet stripping apparatus 10, the elongated strip of cut carpet is easily disposed of by rolling the cut strip up by hand.

While the best mode for carrying out the invention has been described in detail, those familiar with the art to which this invention relates will recognize alternative ways of practicing the invention as defined by the following claims.

What is claimed is:

1. A carpet stripping apparatus for removing carpet from a supporting surface, said carpet stripping apparatus comprising:

a frame having forward and rearward ends and also having opposite sides; said frame including a handle extending from said rearward end for guiding and maneuvering the carpet stripping apparatus;

a pair of driven rollers mounted on said frame for rotation about horizontally disposed parallel axes; said rollers being driven for counter rotation with respect to each other; and said rollers also being operable for receiving a loose end of a carpet between said rollers; said rollers propelling the apparatus forward as the carpet is fed through said rollers;

a pair of knives mounted on said frame; each said knife being mounted near one of said sides for cutting the carpet into an elongated strip as the carpet stripping apparatus is propelled forward.

2. Apparatus as in claim 1 further including a rear support wheel for supporting the frame.

3. Apparatus as in claim 2 further including a front support wheel supporting the frame.

4. Apparatus as in claim 1 further including a spring action top roller tension assembly mounted on said frame that allows application and adjustment of a clamping action on the carpet between said rollers.

5. Apparatus as in claim 1 further including an electric motor coupled to said driven rollers to drive said rollers.

6. Apparatus as in claim 5 further including a switch mounted on said handle for actuating said motor when the switch is actuated and the handle is grasped, and for terminating operating of said apparatus when said handle is released.

7. A method for stripping material adhering to a supporting surface from said surface comprising the steps of:

cutting the material on the surface into one or more elongated strips;

freeing a short section of one end of one of said elongated strips;

feeding the freed end of said strip between a set of clamping driven rollers so that said strip of material is separated from said supporting surface at approximately a right angle to said supporting surface as it passes between said driven rollers; and driving said rollers counterclockwise to each other to "pull" said strip therebetween.

8. A method for stripping carpet from a supporting surface using a carpet stripping apparatus including a frame, a pair of parallel horizontally disposed driven rollers mounted on said frame for counter rotation with respect to each other, a spring action top roller tension assembly mounted on said frame, and a pair of knives transversely spaceably mounted on said frame, said method comprising the steps of:

manually freeing a short section of the carpet from the supporting surface;

feeding the short freed section between the driven rollers; and actuating rotation of said rollers to cause the apparatus to be propelled forward and to thereby pull carpet off the supporting surface as the apparatus is moved.

9. The method as in claim 8 wherein the carpet is pulled up at a right angle to the supporting surface.

10. The method as in claim 8 further including the step of adjusting the spring action top roller tension assembly to assure clamping of the carpet between the rollers.

* * * * *